United States Patent
Knopp et al.

(10) Patent No.: US 12,301,602 B2
(45) Date of Patent: May 13, 2025

(54) IDENTITY THREAT DETECTION AND RESPONSE

(71) Applicant: ProSOC, Inc., San Diego, CA (US)

(72) Inventors: Jordan Knopp, Anaheim, CA (US); Bradley Houston Taylor, Newport Coast, CA (US); Brad Catcott, San Diego, CA (US)

(73) Assignee: ProSOC, Inc., Carlsbad, CA (US)

( * ) Notice: Subject to any disclaimer, the term of this patent is extended or adjusted under 35 U.S.C. 154(b) by 135 days.

(21) Appl. No.: 17/946,880

(22) Filed: Sep. 16, 2022

(65) Prior Publication Data

US 2024/0098103 A1    Mar. 21, 2024

(51) Int. Cl.
*H04L 9/40* (2022.01)

(52) U.S. Cl.
CPC ...... *H04L 63/1425* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,904,531 | B1* | 12/2014 | Saklikar | H04L 63/1416 726/25 |
| 2015/0128274 | A1* | 5/2015 | Giokas | H04L 51/212 726/23 |
| 2022/0303247 | A1* | 9/2022 | Wahbo | H04L 63/1425 |
| 2023/0319088 | A1* | 10/2023 | Chesla | H04L 63/1416 726/23 |

FOREIGN PATENT DOCUMENTS

CN     116821750 A  *  9/2023  ............. G06F 18/24

* cited by examiner

*Primary Examiner* — Sanchit K Sarker
(74) *Attorney, Agent, or Firm* — LOZA & LOZA LLP; Eric T. King

(57) ABSTRACT

Embodiments of the disclosure are related to a method, apparatus, and system for identity threat detection and response for a client computer network including: collecting network security logs for the client computer network; monitoring the network security logs; generating an alert if a condition of the network security logs matches a correlation rule or an anomaly is determined to meet a predefined condition; and, based upon the alert, initiating an automated response including disabling a user account of the client computer network.

10 Claims, 6 Drawing Sheets

IDENTITY THREAT DETECTION AND RESPONSE

FIELD

Embodiments of the disclosure are related to computer networks, and more particularly, to identity threat detection and response for a client computer network.

RELEVANT BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly, various network security monitoring systems have been developed to help uncover attempts by unauthorized persons and/or devices to gain access to computer networks and the information stored therein.

Unfortunately, in present network security monitoring system implementations, when a threat of a potentially unauthorized user is detected, an administrator is required to manually disable the affected user account as a containment action. This takes a significant amount of time and can leave a sufficient window of time for a cyberattack to be carried out.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments. Embodiments of disclosure described herein may relate to functionality implemented across multiple devices. Obvious communications (e.g., transmissions and receipts of information) between the devices may have been omitted from the description in order not to obscure the disclosure.

Embodiments of the disclosure are related to a method, apparatus, and system for identity threat detection and response for a client computer network. In one embodiment, the method, apparatus and system includes: collecting network security logs for a client computer network; monitoring the network security logs; generating an alert if a condition of the network security logs matches a correlation rule or an anomaly is determined to meet a predefined condition; and, based upon the alert, initiating an automated response including disabling a user account of the client computer network. This identity threat detection and response (ITDR) solution allows embodiments of the invention to automatically and immediately disable a user account in response to the detected or perceived threat to the client computer network. This is opposed to prior art techniques, in which, when a threat of a potentially unauthorized user is detected, an administrator is required to manually disable the affected user account as a containment action, which takes a significant amount of time and can leave a sufficient window of time for a cyberattack to be carried out.

Figure 1:
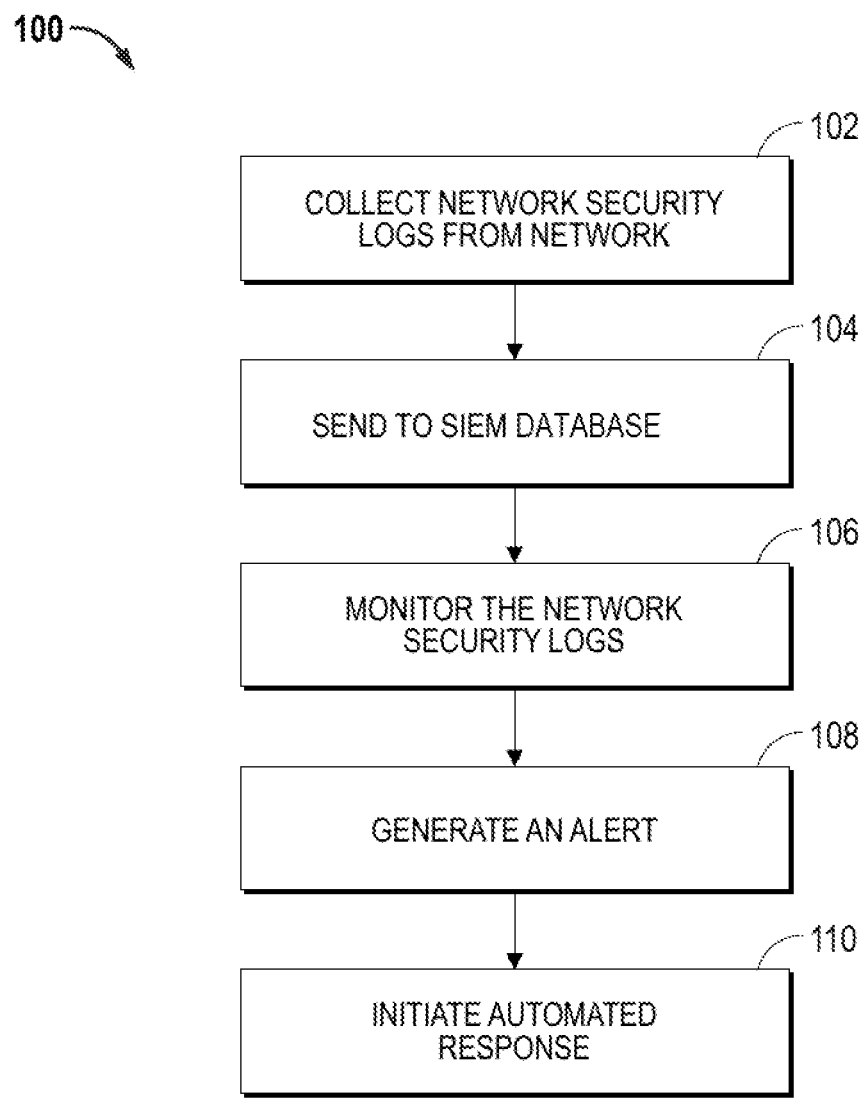
FIG. 1 is a flowchart illustrating an example method for identity threat detection and response for a client computer network, according to one embodiment of the disclosure.

Referring to FIG. 1, FIG. 1 is a flowchart 100 illustrating an example method for identity threat detection and response for a client computer network, according to one embodiment of the disclosure.

At block 102, network security logs are collected for a client computer network. At block 104, network security logs for the client computer network are sent to a database of a security information and event management (SIEM) environment. Next, at block 106, the network security logs are monitored. As will be described, a rule and alert engine may perform this monitoring functionality. At block 108, an alert may be generated if a condition of the network security logs matches a correlation rule or an anomaly is determined to meet a predefined condition. Based upon the alert, at block 110, an automated response may be initiated, that as will be described in more detail, hereafter, includes disabling a user account of the client computer network.

Figure 2:
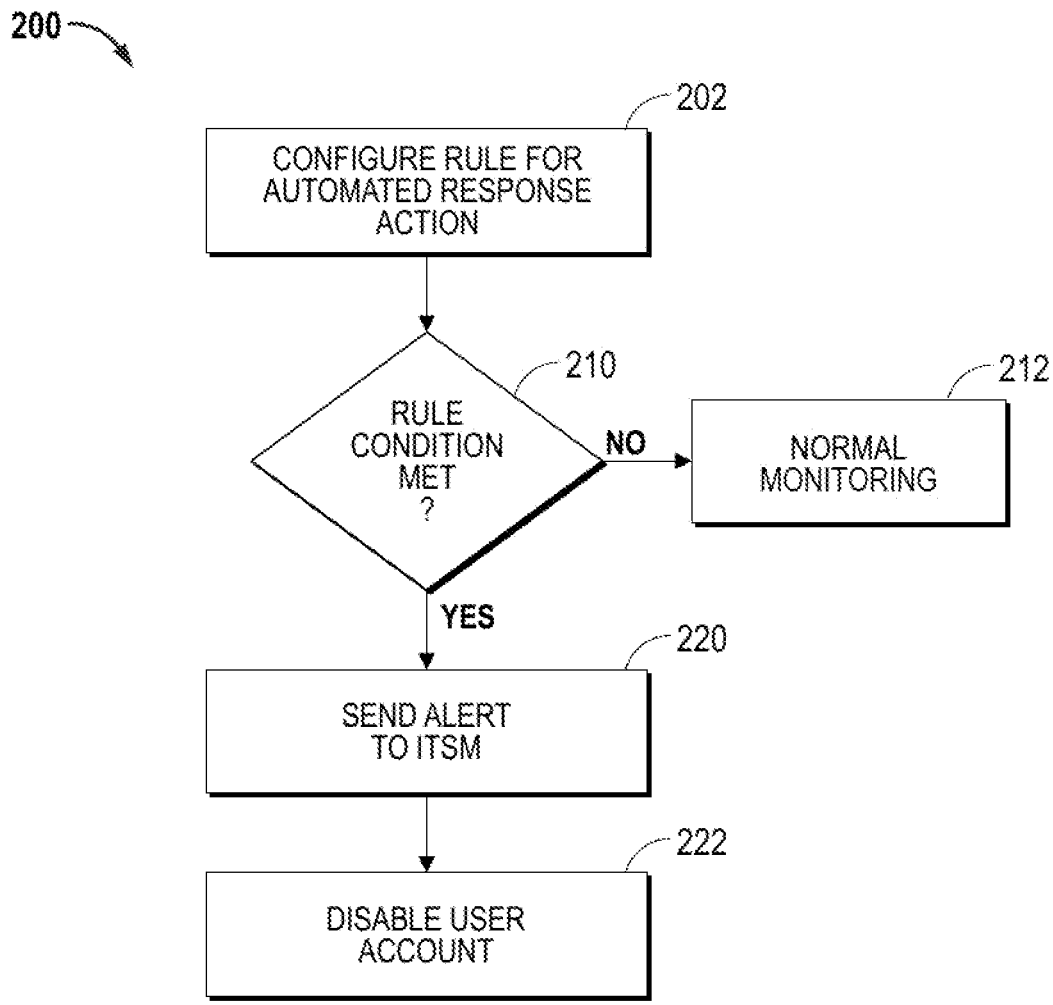
FIG. 2 is a flowchart illustrating a further example method for identity threat detection and response for a client computer network, according to one embodiment of the disclosure.

With brief additional reference to FIG. 2, FIG. 2 is a flowchart 200 illustrating a further example method for identity threat detection and response for a client computer network, according to one embodiment of the disclosure. To begin with, at block 202, a rule is configured for an automated response action. These rules may be established by the client computer network, by the system implementing threat detection and response through the rule and alert engine, and combinations thereof. Examples of these types of rules and the rule and alert engine will be described in more detail hereafter. If the rule condition is not met (block 210), normal monitoring continues (block 212). If the rule condition is met (e.g., identifying a potential threat), then an alert is sent to the IT service management (ITSM) platform (block 220) and the user account of the client computer network associated with the alert is disabled (block 220).

Figure 3:
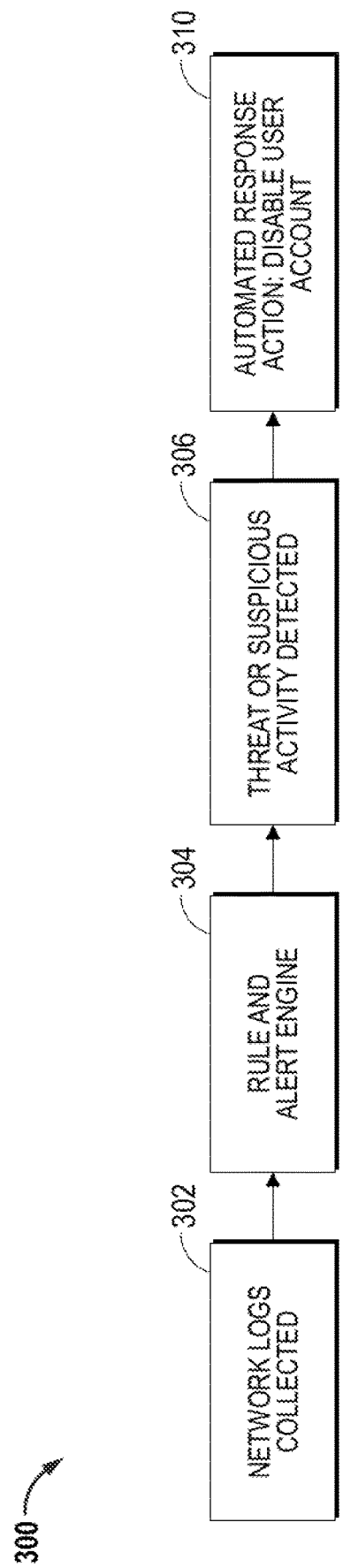
FIG. 3 is a diagram illustrating a further example for identity threat detection and response for a client computer network, according to one embodiment of the disclosure.

With brief additional reference to FIG. 3, FIG. 3 is a diagram 300 illustrating a further example for identity threat detection and response for a client computer network, according to one embodiment of the disclosure. As shown in FIG. 3, network security logs are collected from the client computer network and sent to the (SIEM) environment (block 302). Next, at block 304 and block 306, a rule and alert engine 304 is used to determine whether a threat or suspicious activity has been detected 306 for the client computer network. In particular, the rule and alert engine 304 is used to monitor the network security logs and triggers an alert, if the rule and alert engine 304 determines whether a condition of the network security logs matches a correlation rule or an anomaly is determined to meet a predefined condition. When an alert is generated, at block 310, an automated response is initiated to contain the threat. In one embodiment, the specified automated response is to disable a user account of the client computer network associated with the threat as a containment measure.

Figure 4:
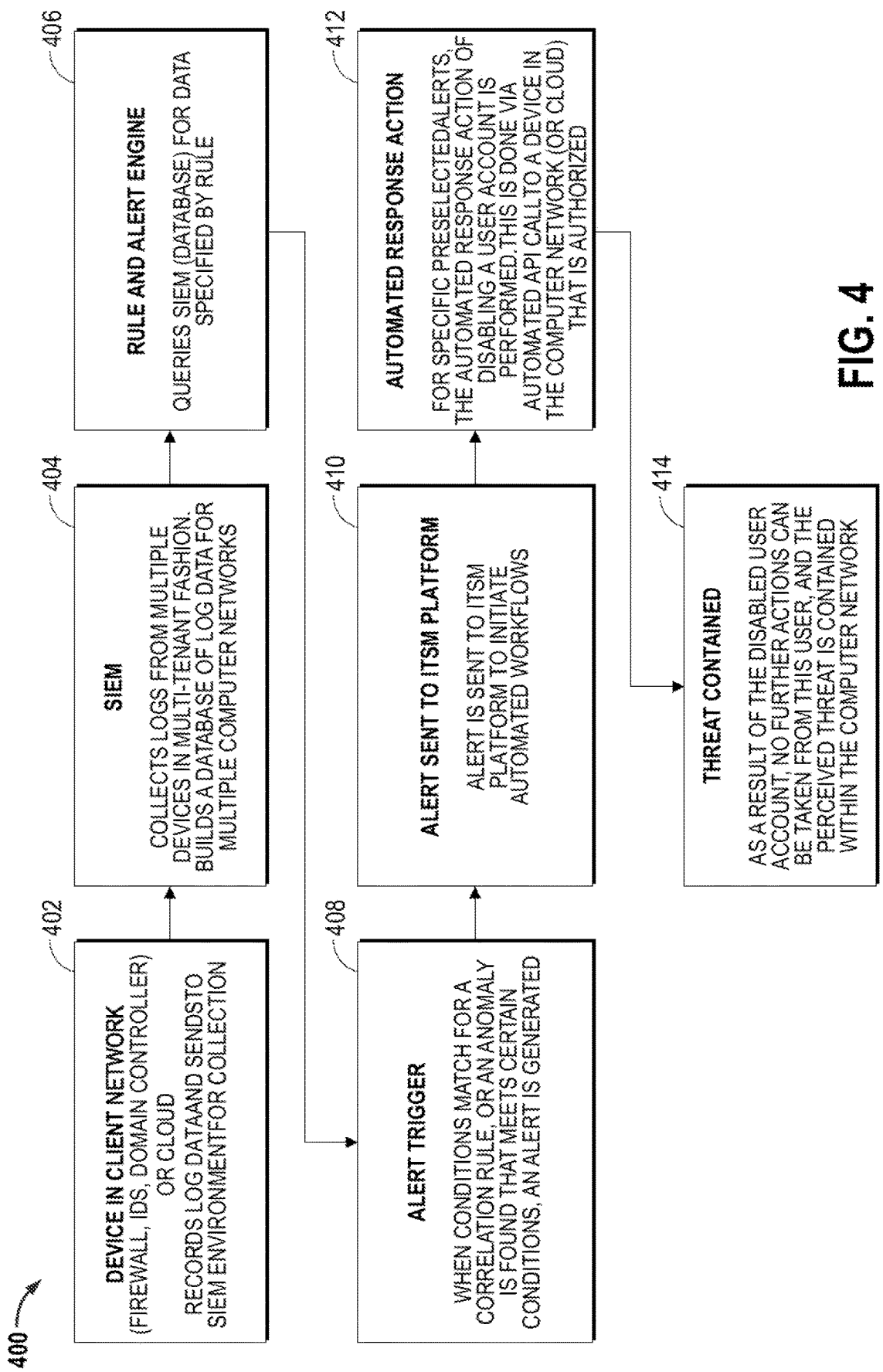
FIG. 4 is a block diagram that illustrates an overall structure of a method, apparatus, and system for identity threat detection and response (ITDR) for a client computer network, according to one embodiment of the disclosure.

Referring to FIG. 4, block diagram 400 illustrates an overall structure of a method, apparatus, and system for identity threat detection and response (ITDR) for a client computer network, according to one embodiment of the disclosure. Therefore, block diagram 400 implements the ITDR process.

For example, at block 402, network security log data is collected for the devices in a client computer network or cloud platform being monitored. As an example, network security log data is collected for such devices as firewalls, intrusion detection systems (IDSs), domain controllers, etc. However, it should be appreciated that network security logs may be collected from any device of the client computer network being monitored or the cloud platform being monitored. This network security log data is recorded and sent to the SIEM environment 404. At block 404, at the SIEM environment, the network security logs are collected from multiple client devices of the multiple client computer networks being monitored in a multi-tenant fashion and a SIEM database is built containing network security logs for each of the devices of each of the client computer networks of the multiple client computer networks being monitored.

At block 406, the network security logs of the SIEM database are monitored by a rules and alert engine. As an example, the rules and alerts engine 406 queries the SIEM database for data specified by the rules. As will be described, at block 406, the rules and alerts engine searches the SIEM database for specific types of network security log data that may be indicative of suspicious user activities, general suspicious device activities, unusual authentications, unexpected user events, unusual user authentication attempts, any suspicious activity that represents a threat, activities that may be related to a cyberattack, etc. The rules and alerts engine 406 implements a collection of algorithms that search the SIEM database for suspicious or malicious activities in the client computer networks or cloud platforms being monitored. For example, one example that may monitored for is a "virus outbreak"—a detection of the same virus on multiple different devices in the same client computer network being monitored. Based upon these rules, the rule and alert engine is constantly scanning the network security logs of the SIEM database.

At block 408, an alert trigger may occur. Based upon the search of the SIEM database, by the rules and alerts engine 406, when the rules and alert engine determines if a condition of the network security logs matches a correlation rule or an anomaly is determined to meet a predefined condition, then the rules and alerts engine will trigger an alert. For example, using the same virus outbreak example, a virus outbreak threshold rule condition may be −3 or more devices that have the same virus detection within a 10-minute window. If the rules and alert engine determines that a condition has been met by finding a match in the network security logs of a correlation rule (e.g., 3 or more devices with virus detection within a 10-minute window) that it is searching for, then the rules and alerts engine generates an alert that is sent to the IT service management platform 410.

This also applies to an anomaly detection. If an anomaly is determined to meet a predefined condition, then the rules and alerts engine will trigger an alert that is sent to the IT service management platform 410. A wide variety of anomalies may be searched for and detected. For example, if a user attempts authentication from a device more than 100 times in 1 minute, this may meet the predefined condition, and the rules and alerts engine will trigger an alert that is sent to the IT service management platform 410. Another example of anomaly to trigger an alert may be a successful authentication of a blacklisted IP address.

It should be appreciated that these detections of matches of correlation rules or anomalies meeting predefined conditions may based on searches of the SIEM 404 of the current system 400 or by searches of a SIEM of the client computer network or cloud platform itself. Further examples of the matching of correlation rules to trigger an alert or an anomaly meeting a predefined condition to trigger an alert will be described. It should be appreciated that a wide variety of correlation rules and predefined conditions to trigger alerts based on a wide variety of monitored suspicious or malicious activities in client computer networks or cloud platforms being monitored by scanning the network security logs of a SIEM database may be utilized. Some other examples will be briefly discussed.

Figure 5:
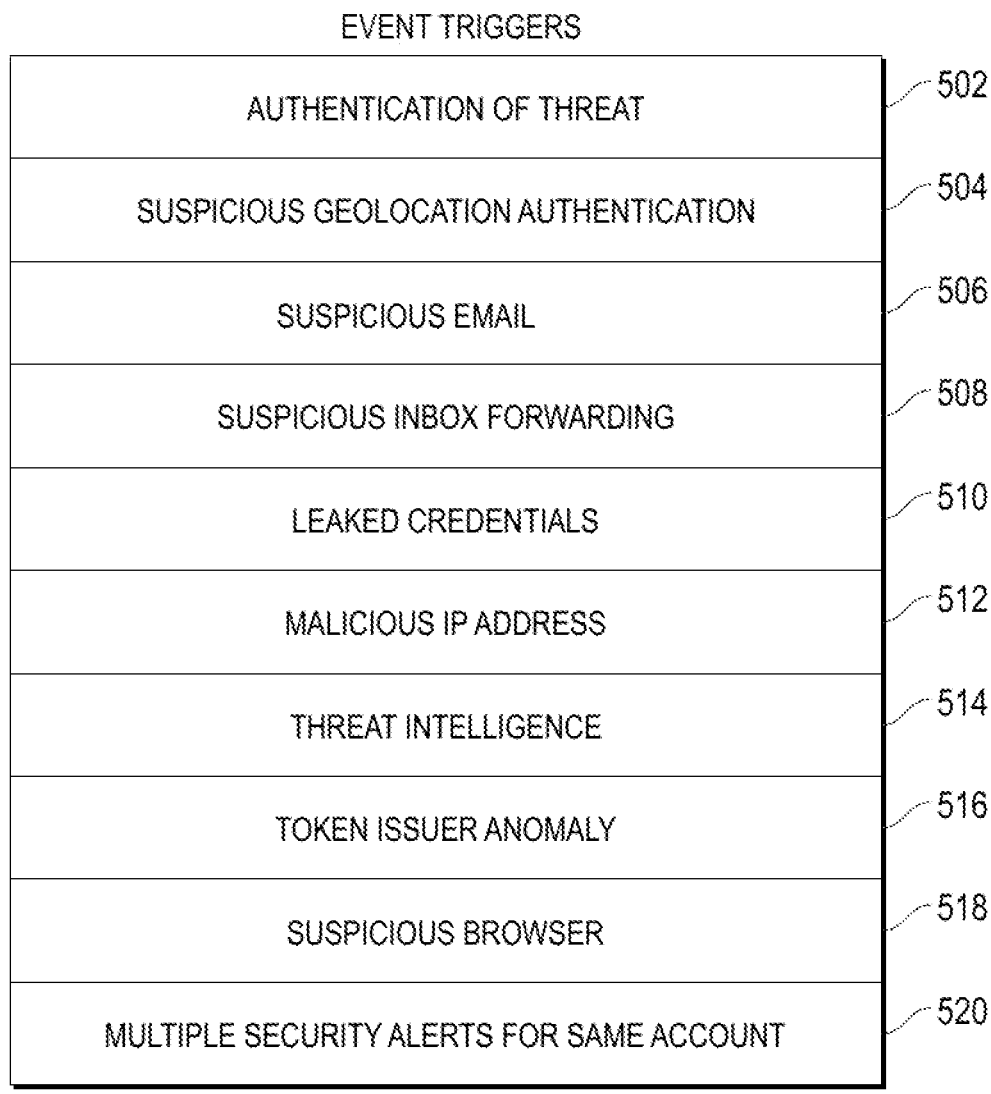
FIG. 5 is a table that illustrate examples of possible events that can be monitored as network security logs in the SIEM database by the rules and alert engine, according to one embodiment of the disclosure.

With brief reference to FIG. 5, FIG. 5 illustrates examples of possible events that can be monitored as network security logs in the SIEM database by rules and alert engine 406 and can be analyzed to determine if a correlation rule is matched or an anomaly is determined to meet a predefined condition to trigger an alert: authentication of a threat from client computer network 502, suspicious geolocation authentication 504, suspicious emails 506, suspicious inbox forwarding 508, leaked credentials 510, malicious IP address 512, threat intelligence from client computer network 514, token issuer anomaly 516, suspicious browser 518, multiple security alerts for same account from client computer network 520. It should be appreciated that any of these events can be used for the detection of matches of correlation rules or anomalies meeting predefined conditions and that any of these events may be determined based on searches of the SIEM database by the rules and alerts engine 406. It should be appreciated that these are just examples, and that a wide variety of monitored suspicious or malicious activities in client computer networks or cloud platforms being monitored by scanning the network security logs of a SIEM database may be utilized.

With reference again to FIG. 4, as has been described, at block 410, an alert is sent to the IT service management (ITSM) platform 410. In particular, the alert is sent to the ITSM platform so that the ITSM can initiate automated workflows.

Next, at block, block 412, for specific preselected alerts, the automated response action of disabling a user account is performed. This is useful in that, for specific preselected alerts (such as those previously described), a user account is disabled via automated action. These are designated for the user account associated with the alert. For example, the user account that was successfully authenticated to a blacklisted IP address, as previously described. In this way, when the user account is disabled, the threat is contained. This type of automated response action provides protection for the client computer network or cloud platforms being monitored without the requirement of an administrator having to manually disable the affected user account as a containment action, as in prior art implementations.

In one embodiment, as in block 412, the automated response to disable the user account in automated workflow is implemented by an automated application program interface (API) for a device in the client computer network or cloud platform designated with the ability or authorization to disable the user account. In one embodiment, the automated response to disable the user account by implementing the automated application program interface (API) for the device in the client computer network or cloud platform designated with the ability or authorization to disable the user account may include updating an account enabled field for the user account in the device to False.

At block 414, as a result of the disabled user account, no further actions can be taken from this user, and the perceived threat is contained within the client computer network or cloud platform. This is opposed to prior art techniques, in which, when a threat of a potentially unauthorized user is detected, an administrator is required to manually disable the affected user account as a containment action, which takes a significant amount of time and can leave a sufficient window of time for a cyberattack to be carried out.

In one embodiment, the previously described Identity Threat Detection and Response (ITDR) process 400 provides the automatic disabling of a user account based on the detection of specific security incidents. In particular, the previously described process allows clients to configure rules and alerts in the rules and alert engine 406, that, when conditions are matched for a correlation rule or an anomaly is found that meets a predefined condition, an alert is automatically triggered and an automated response action is taken to disable the user account. In this way, the client can expect a rapid response for a customizable list of detections that they select via the rules and alert engine 406 to effectively contain threats before more damage is done.

For example, FIG. 5 illustrates examples of possible events that can be monitored as network security logs in the SIEM database by rules and alert engine 406 and can be analyzed to determine if a correlation rule is matched or an anomaly is determined to meet a predefined condition to trigger an alert: authentication of a threat from client computer network 502, suspicious geolocation authentication 504, suspicious emails 506, suspicious inbox forwarding 508, leaked credentials 510, malicious IP address 512, threat intelligence from client computer network 514, token issuer anomaly 516, suspicious browser 518, multiple security alerts for same account from client computer network 520. It should be appreciated that any of these events can be used for the detection of matches of correlation rules or anomalies meeting predefined conditions and that any of these events may be determined based on searches of the SIEM database. It should be appreciated that these are just examples, and that a wide variety of monitored suspicious or malicious activities in client computer networks or cloud platforms being monitored by scanning the network security logs of a SIEM database may be utilized.

It should be further appreciated that these events that cause active defense automated triggers by the ITDR process 400 may be determined and reported by a cloud computing platform operating with the client computer network. Such a cloud computing platform may be MICROSOFT AZURE. As an example, possible events 500 previously described may come from MICROSOFT cloud application security (via e.g., MICROSOFT graph APIs or other sources). It should be appreciated that other types of cloud computing platforms may be utilized and that is just one example.

As an example of the workflow for the ITDR process 400, SIEM 404 collects suspicious or malicious user activity in its database, rules and alerts engine 406 queries SIEM 404 for suspicious or malicious user activity and when conditions match a correlation rule or an anomaly is found by rules and alerts engine 406, then rules and alerts engine 406 issues an alert to ITSM platform 410. A record is generated in the ITSM platform to initiate active defense. An automated response action 412 to disable a user account associated with the suspicious or malicious user activity is run.

In one embodiment, based upon an email address associated with the user account, the automated response action 412 may initiate an active defense service that queries a cloud computing platform to find a matching email address. As an example, for MICROSOFT AZURE, a username can be pulled as an email address (user@domain.com) from logs, this may be used as input parameter for active defense.

As an example, for MICROSOFT AZURE, MICROSOFT Graph API may be queried to retrieve an AZURE AD directoryObject that matches the email address of the user account. Depending on the requested action (Lock or Unlock), the active defense service will update the user object "accountEnabled" field to either True or False.

As has been described, in one embodiment, the automated response 412 may disable the user account by implementing the automated application program interface (API) for the device in the client computer network or the cloud computing platform (e.g., MICROSOFT AZURE) designated with the ability or authorization to disable the user account, which may include updating an account enabled field for the user account in the device to False.

Under this scenario, when a user account is disabled, it will not automatically be enabled after a certain amount of time. This is in contrast to a user account being "locked out", which does unlock after a certain amount of time. When an account is not enabled, the account cannot be logged into without administrative intervention. The action taken on the account will remain unless another active defense action is initiated to enable the account, or an administrator logs into the console and manually updates the user object to enable the account.

Also, it should be appreciated that the ITDR process 400 when working with a cloud computing platform (e.g., MICROSOFT AZURE), if a user account is disabled via the active defense implementation of ITDR process 400 for a cloud computing platform (e.g., MICROSOFT AZURE), then any application using domain authentication with the cloud platform will prevent logins from that user. In particular, because applications integrated with a cloud computing platform (e.g., MICROSOFT AZURE) receive identity and access management from it, actions performed on a user in the cloud computing platform will affect application that sync with it.

Also, with Lightweight Directory Access Protocol (LDAP) authentications, if the account is locked, the cloud computing platform will let the client know and logins will be prevented. The consequence of the account being disabled is that the client user can stay logged in (session) but any new session would be declined. For example, if a client user did not already have their email opened and they tried to open it, the connection would not be allowed.

It should be appreciated that the previously described ITDR process 400 may work directly with a client computer network or with a cloud computing platform (e.g., MICROSOFT AZURE) that supports clients, applications, etc. Although, MICROSOFT AZURE has been described as an example cloud computing platform, aspects of the invention may be utilized with any type of cloud computing platform.

It should be appreciated that these are just examples of implementations of a method, apparatus, and system for identity threat detection and response (ITDR) for a client computer network. As has been described, in one embodiment, the method, apparatus and system includes: collecting network security logs for a client computer network; monitoring the network security logs; generating an alert if a condition of the network security logs matches a correlation rule or an anomaly is determined to meet a predefined condition; and, based upon the alert, initiating an automated response including disabling a user account of the client computer network. This identity threat detections and response (ITDR) solution allows embodiments of the invention to automatically and immediately disable a user account in response to the detected or perceived threat to the client computer network. This is opposed to prior art techniques in which, when a threat of a potentially unauthorized user is detected, an administrator is required to manually disable the affected user account as a containment action, which takes a significant amount of time and can leave a sufficient window of time for a cyberattack to be carried out.

Figure 6:
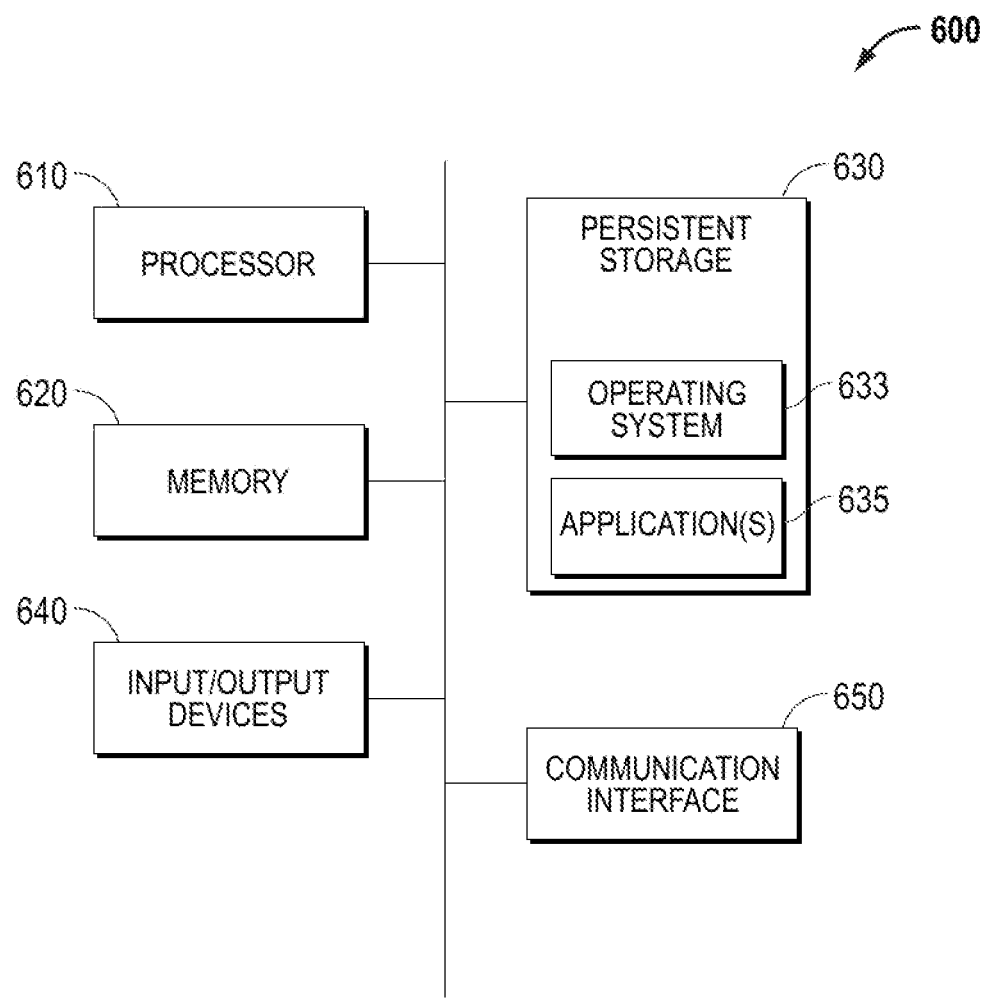
FIG. 6 is a block diagram illustrating an example computing device, according to embodiments of the disclosure.

Referring to FIG. 6, a block diagram illustrating an example computing device 600 according to embodiments of the disclosure is shown. The device may comprise a processor 610, a memory 620, a persistent storage 630, one or more input/output devices 640, and a communication interface 650. The memory 620 may comprise a random access memory (RAM) and a read-only memory (ROM). An operating system 633 and one or more applications 635 may be stored in the persistent storage 630. The code stored in the persistent storage 630 may be loaded into the memory 620 and executed by the processor 610. When code is executed by the processor 610, the device 600 may perform one or more functions based on the code, such as the operating system 633 or the applications 635. The one or more applications 635 may be adapted for various functions and purposes. The communication interface 650 may enable the device 600 to communicate with one or more other devices using one or more known wired or wireless communication protocols.

Merely by way of example, one or more procedures described with respect to the method(s) previously described may be implemented as code and/or instructions executable by a device (and/or a processor within a device). A set of these instructions and/or code may be stored on a non-transitory computer-readable storage medium, such as the persistent storage device(s) 630 described above. In some cases, the storage medium might be incorporated within a computer system, such as the device 600. In other embodiments, the storage medium might be separate from the devices (e.g., a removable medium, such as a compact disc), and/or provided in an installation package, such that the storage medium can be used to program, configure, and/or adapt a computing device with the instructions/code stored thereon. These instructions might take the form of executable code, which is executable by the device 600 and/or might take the form of source and/or installable code, which, upon compilation and/or installation on the device 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

It should be appreciated that aspects of the previously described processes may be implemented in conjunction with the execution of instructions by a processor (e.g., processor 610) of a device (e.g., device 600), as previously described. Particularly, circuitry of the devices, including but not limited to processors, may operate under the control of a program, routine, or the execution of instructions to execute methods or processes in accordance with embodiments described (e.g., the processes and functions of FIGS. 1-5). For example, such a program may be implemented in firmware or software (e.g. stored in memory and/or other locations) and may be implemented by processors and/or other circuitry of the devices. Further, it should be appreciated that the terms device, processor, microprocessor, circuitry, controller, SoC, etc., refer to any type of logic or circuitry capable of executing logic, commands, instructions, software, firmware, functionality, etc.

It should be appreciated that when the devices are wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, LTE Advanced, 4G, 5G, CDMA, TDMA, OFDM, OFDMA, WiMAX, Wi-Fi, Bluetooth, Zigbee, LoRA, and Narrowband-IoT (NB-IoT). Similarly, a wireless device may support or otherwise use one or more of a variety of corresponding modulation or multiplexing schemes. A wireless device may thus include appropriate components (e.g., communication subsystems/interfaces (e.g., air interfaces)) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a virtual reality or augmented reality device, a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for identity threat detection and response for a client computer network comprising:
   collecting network security logs for the client computer network;
   monitoring the network security logs;
   generating an alert if a condition of the network security logs matches a correlation rule or an anomaly is determined to meet a predefined condition, wherein the network security logs are sent to a security information and event management (SIEM) database and are monitored by a rules and alert engine;
   determining by the rules and alert engine if a condition of the network security logs matches a correlation rule or an anomaly is determined to meet a predefined condition, and if so, transmitting the alert to an IT service management platform; and
   based upon the alert, initiating an automated response including disabling a user account of the client computer network, wherein, the IT service management platform initiates an automated workflow to implement the automated response to disable the user account by implementing an automated application program interface (API) for a device in the client computer network designated with an ability to disable the user account.

2. The method of claim 1, wherein the network security logs collected are for multiple devices of the client computer network and are collected in multi-tenant fashion with other network security logs from other devices of other client computer networks being monitored.

3. The method of claim 1, wherein the correlation rules or the anomaly are related to at least one of: a suspicious geolocation authentication, suspicious emails, suspicious inbox forwarding, a malicious IP address, a token issuer anomaly, or a suspicious browser.

4. The method of claim 1, wherein the correlation rules or the anomaly are related to at least one of: authentication of a threat from the client computer network, leaked credentials, threat intelligence from the client computer network, or multiple security alerts for a same account from the client computer network.

5. The method of claim 1, wherein, the automated response to disable the user account by implementing the automated application program interface (API) for the device in the client computer network designated with the ability to disable the user account includes updating an account enabled field for the user account in the device to False.

6. A non-transitory computer-readable medium comprising code which, when executed by a processor, causes the processor to execute a method for identity threat detection and response for a client computer network comprising:

collecting network security logs for the client computer network;

monitoring the network security logs;

generating an alert if a condition of the network security logs matches a correlation rule or an anomaly is determined to meet a predefined condition, wherein the network security logs are sent to a security information and event management (SIEM) database and are monitored by a rules and alert engine;

determining by the rules and alert engine if a condition of the network security logs matches a correlation rule or an anomaly is determined to meet a predefined condition, and if so, transmitting the alert to an IT service management platform; and based upon the alert, initiating an automated response including disabling a user account of the client computer network, wherein, the IT service management platform initiates an automated workflow to implement the automated response to disable the user account by implementing an automated application program interface (API) for a device in the client computer network designated with an ability to disable the user account.

7. The non-transitory computer-readable medium of claim 6, wherein the network security logs collected are for multiple devices of the client computer network and are collected in multi-tenant fashion with other network security logs from other devices of other client computer networks being monitored.

8. The non-transitory computer-readable medium of claim 6, wherein the correlation rules or the anomaly are related to at least one of: a suspicious geolocation authentication, suspicious emails, suspicious inbox forwarding, a malicious IP address, a token issuer anomaly, or a suspicious browser.

9. The non-transitory computer-readable medium of claim 6, wherein the correlation rules or the anomaly are related to at least one of: authentication of a threat from the client computer network, leaked credentials, threat intelligence from the client computer network, or multiple security alerts for a same account from the client computer network.

10. The non-transitory computer-readable medium of claim 6, wherein, the automated response to disable the user account by implementing the automated application program interface (API) for the device in the client computer network designated with the ability to disable the user account includes updating an account enabled field for the user account in the device to False.

\* \* \* \* \*